US006813263B1

(12) United States Patent
Margherita

(10) Patent No.: US 6,813,263 B1
(45) Date of Patent: Nov. 2, 2004

(54) DISCRIMINATION PROCEDURE OF A WANTED SIGNAL FROM A PLURALITY OF COCHANNEL INTERFERING SIGNALS AND RECEIVER USING THIS PROCEDURE

(75) Inventor: Fulvio Margherita, Naples (IT)

(73) Assignee: Siemens Mobile Communications S.p.A., Milan (IT)

( * ) Notice: Subject to any disclaimer, the term of this patent is extended or adjusted under 35 U.S.C. 154(b) by 0 days.

(21) Appl. No.: 09/581,794

(22) PCT Filed: Dec. 14, 1998

(86) PCT No.: PCT/EP99/08165

§ 371 (c)(1), (2), (4) Date: Jul. 28, 2000

(87) PCT Pub. No.: WO99/33141

PCT Pub. Date: Jul. 1, 1999

(30) Foreign Application Priority Data

Dec. 19, 1997 (IT) ........................................ MI97A2825

(51) Int. Cl.[7] ................................................ H04B 7/212
(52) U.S. Cl. ....................................................... 370/347
(58) Field of Search ................................ 370/319, 320, 370/321, 328, 336, 337, 339, 343, 344, 345, 347; 375/346, 347, 348, 349, 350

(56) References Cited

U.S. PATENT DOCUMENTS

| | | | | |
|---|---|---|---|---|
| 5,574,824 A | | 11/1996 | Slyh et al. | |
| 5,973,638 A | * | 10/1999 | Robbins et al. | 342/172 |
| 6,154,486 A | * | 11/2000 | Scott et al. | 375/142 |
| 6,236,363 B1 | * | 5/2001 | Robbins et al. | 342/360 |

FOREIGN PATENT DOCUMENTS

| | | |
|---|---|---|
| EP | A2604956 | 7/1994 |
| EP | A2809323 | 11/1997 |
| FR | A12747792 | 10/1997 |
| WO | WO 9522873 | 8/1995 |

OTHER PUBLICATIONS

P. Stocia, MSc, EngScD, PROCEEDINGS, vol. 137, Pt.F. No. 1, pp. 19–26 (Feb. 1990).

Mats Viberg et al, "Detection and Estimation in Sensor Arrays Using Weighted Subspace Fitting".

Barry D. Van Veen et al, IEEE ASSP Magazine, pp. 4–24, (Apr. 1988).

S. Anderson, M. Millnert, M. Viberg, B. Wahlberg "An Adaptive Array for Mobile Communication Systems". IEEE Trans. Vehicular Technology. vol. 40. No. 1. pp. 230–236. Feb. 1991.

* cited by examiner

*Primary Examiner*—Kwang Bin Yao
(74) *Attorney, Agent, or Firm*—Birch, Stewart, Kolasch & Birch, LLP

(57) ABSTRACT

It is described a discrimination procedure of a wanted signal from a plurality of cochannel interferents received by array antennas of GSM or DCS base transceiver stations. The procedure includes a phase for the estimate of the number and arrival directions of the interferents, and of the wanted signal, followed by a spatial filtering phase in which the signals transduced by the sensors of the array are linearly combined among them through multiplication coefficients, or weights, organized in a vector w satisfying the two following in conditions:

A) Spatial filtering constrains the gain of the array in the ratio between wanted signal and noise, compared to the traditional use of a single sensor, so that the gain is not less than a properly selected threshold;

B) it minimizes the ratio between the sum of interferents' powers and wanted signal power.

16 Claims, 6 Drawing Sheets

| | Gn | Δ(S/N) | Δ(C/I) | Δ(S/(I+N)) |
|---|---|---|---|---|
| LCMV | -25.3 | -24.8 | 232.9 | 15.1 |
| LC | -5.3 | -5.8 | 289.8 | 34.1 |
| MV | -25.9 | -25.5 | 17.9 | 13.4 |
| CGMI | 6.0 | 5.2 | 3.5 | 3.5 |

| | Gn | Δ(S/N) | Δ(C/I) | Δ(S/(I+N)) |
|---|---|---|---|---|
| LCMV | 9.0 | 9.0 | 1.4 | 1.4 |
| LC | 9.0 | 8.9 | 1.4 | 1.4 |
| MV | 8.4 | 8.2 | 1.3 | 1.3 |
| CGMI | 6.0 | 5.8 | 3.4 | 3.4 |

| | Gn | Δ(S/N) | Δ(C/I) | Δ(S/(I+N)) |
|---|---|---|---|---|
| LCMV | -5.3 | -5.0 | 296.3 | 35.1 |
| LC | -5.3 | -5.0 | 289.9 | 35.1 |
| MV | -6.1 | -5.8 | 14.6 | 14.6 |
| CGMI | 6.0 | 6.5 | 3.7 | 3.7 |

DISCRIMINATION PROCEDURE OF A WANTED SIGNAL FROM A PLURALITY OF COCHANNEL INTERFERING SIGNALS AND RECEIVER USING THIS PROCEDURE

This application is the national phase under 35 U.S.C. § 371 of PCT International Application No. PCT/EP98/08165 which has an International filing date of Dec. 14, 1998, which designated the United States of America.

FIELD OF THE INVENTION

The present invention relates to the field of the so-called "intelligent" array antennas, and more in particular to a discrimination procedure of a wanted signal from a plurality of cochannel interferents received by array antennas of base transceiver stations for cellular telecommunication and relative receiver.

1. Background Art

The use in mobile radio environment of antenna consisting of one or more arrays of electromagnetic field sensors (array) is known, for instance, from the European patent application published under No. 0593822A1. This document in fact, describes, mentioning the first claim, "An arrangement of antennas for a base transceiver station including a plurality of antenna arrays, each array able to form a multiplicity of narrow radiation lobes, separated and partially overlapped in the azimuth plane, the arrays being positioned in such a way that all the lobes generated by the same give a substantial omnidirectional coverage on said plane; lobes formation means (beamforming) in azimuth and angular elevation for each said array; a plurality of radiofrequency transceivers each one to transmit and receive the signals relative to one or more channels; a switching matrix to connect each transceiver with one or the other array through said beamforming means; etc.".

More in particular, a beam former, for example a Butler matrix, is associated to an antenna array. A beam former consists of phase shifting and adder circuits, used in reciprocal way both in reception and in transmission. Considering for instance reception, the beam former has a plurality of input ports for the signals coming from the sensors of the array , and a multiplicity of output ports, each one relative to a pre-set azimuth direction and corresponding to a particular combination of module and phase of input signals. A dual behaviour applies to transmission, where the same port selected during reception is used to transmit towards the mobile . The antenna array, and relative beam former, are therefore an essential part of a system capable to identify the direction of the signal transmitted uplink by a mobile, that the system follows condensing a narrow radiation lobe in which the power of the signal transmitted down-link towards the mobile itself is concentrated. This equals to an intelligent behaviour of the antenna, which deviates from the traditional utilization of antennas in the same sector of the technique. Thanks to the intelligent behaviour, the interference from cochannel channel is reduced and the re-utilization of the same frequencies in adjacent cells is made possible. The deriving advantage is considerable and consists in the possibility to increase the dimension of cells, at equal transmitted power, in low traffic areas or reduce the frequency re-utilization distance, increasing the number of carriers per cell in high traffic areas.

The estimate of wanted signal arrival direction avails of means for the measurement of signals present at output ports of the beam formers and of a processor evaluating the above mentioned measures and selecting the best direction, for instance that one for which the signal level is higher.

The antenna arrangement described in the mentioned application, overcomes the limits introduced by sectorial antennas in corner-excited cells, still widely employed in the mobile radio field, due to need of infrasectorial handovers as the position of the mobile part around common antennas varies, though remaining close to the same. The intelligent antenna system enables in fact a transceiver to be associated to any possible narrow radiation lobes, sunburst arranged on the azimuth plane, therefore the cell appears to the network as if it were equipped of omnidirectional antenna, but without the relative known drawbacks.

2. Background Art

Notwithstanding all the features mentioned above, the intelligent antenna arrangement described in the mentioned application, fails to exploit the capability of an antenna array to shape the overall radiation diagram so that nulls are steered in the interferents' directions. For example, if interfering and wanted signal arrival directions are different but contained in the same beam, no discrimination can be made between them. This stands also if beam is selected, after demodulation, on the basis of wanted signal quality.

In order to exploit the interference nulling capabilities of the antenna array a numerical (and not analog) beamforming has to be performed on digitalized signals from the sensors of the array.

Numerical beamforming is nothing more then a linear combination of base band signals from the array elements using a set of complex coefficients w.

The procedures for numerical beamforming mainly differ in the choice of the coefficient's set w and usually 2 different methods can be used (see [1] for a more detailed description and for a comparison based on system capacity):

1) All cochannel user arrival directions are estimated and coefficients w are to chosen with the constraint that the overall array gain is "nulled" in the interferent arrival directions. See also |2| for an overview of known art about beamforming and "null steering".
2) Coefficients w are calculated so that the difference between the combined signal and a reference part of the signal is minimized.

Both these methods for coefficients w calculation suffer from the fact that they optimize uplink receiver performance but the coefficients w are not always reliable for downlink transmission.

For example, when uplink noise level is negligible and the interferent and wanted signal arrival directions are close each other, both methods try to reduce interference as much as possible. The result is often a very low level of the array gain in the direction of the wanted signal and thus only a small fraction of transmitted energy will be directed towards the user.

WO 95/22873 discloses a cellular system receiver including a spatial filter which has up to one input for each antenna element and one output for each spatial channel. An adaptor adjust the spatial filtering in order to enhance one of the channels while suppressing the other. A channel estimator calculates estimated impulse response for each selected channel based upon training sequences and the output from the spatial filter.

In particular adaptation means are disclosed suitable to calculate the weights w that implement the spatial filtering of signal coming from a sensor array. The above description however does not contain any detailed explanation about the proposed algorithm but only mention is made to known or general procedures like "direction of arrival estimation", "minimisation of error signal" and "gradient optimisation method". Neither the cost function to be minimised nor the method to find that minimum is provided in a detailed text.

EP 809323 discloses a signal processing apparatus e.g. for wireless communication system generating beam pattern which has its maximum gain along direction of wanted signal and maintaining gain toward direction of interfering signals in as low level as possible. In particular a method to calculate said weights w is disclosed and according to this method the weights are chosen so to maximizse received wanted signal power. Interference is reduced as a consequence of directivity in the resulting array diagram, but is not minimised placing nulls in the interfering signal arriving directions.

SUMMARY OF THE INVENTION

The scope of the present invention is to overcome the above mentioned drawbacks and to indicate a discrimination procedure of a wanted signal from a plurality of cochannel interferents received by array antennas of base transceiver stations for cellular telecommunication.

To attain these objects, scope of the present invention is a discrimination procedure of a wanted signal from a plurality of cochannel interferents received by array antennas of frequency division (FDMA), or time division (TDMA), or mixed FDMA/TDMA multiple access telecommunication systems, re-employing a same frequency group in adjacent territorial areas, including an estimate phase of the arrival directions of the said interferents and of said wanted signal, and a successive phase of spatial filtering in which signals transduced by the relative sensors of a said array are linearly combined among them through multiplication coefficients, or weights, obtaining a reception signal cleaned from interferents; said phases being repeated for each one of the time slots, in the TDMA frame, in which the wanted user transmits, characterized in that said weights satisfy the two following conditions:

A) the gain of said array in the ratio between said wanted signal and the noise after spatial filtering, compared to the traditional use of a single sensor, is constrained so that it is is not less than a properly selected threshold;

B) the ratio between the sum of interferents' powers and wanted signal power is minimized, as described in claim 1.

According to the above, in the algorithm disclosed in the present application weights w are chosen so minimise intereference, placing nulls in the interfering signal arrival directions, while keeping a minimum value for the array gain in the wanted signal direction.

In EP 0 809 323, according to which the preamble of the main claim is drafted, weights w are chosen so to maximise, as above explained received wanted signal power. According to the above, the teaching of the present application are therefore contrary to the teaching of said EP patent.

The subject procedure can find useful application in the realization of a receiver for base transceiver stations of cellular telephone systems of the GSM 900 MHz, or DCS 1800 MHz type.

The occurrence of condition A) enables to obtain some advantages:

1. To improve the performance in uplink reducing the performance sensitivity of the spatial filtering to the error made in the estimate of wanted signal arrival directions.
2. To enable, in downlink, a high directivity of the antenna array radiation diagram in the direction of the wanted.

The occurrence of condition B) enables to improve the performance in the two connections, uplink and downlink, reducing the interference.

Profitably, it is possible to express in the vectorial form the equations concerning the estimate phases of the arrival direction and spatial filtering, as well as those generated by the imposition of the above mentioned featuring conditions, thus making the mathematical computation for the determination of said weights more compact.

Further object of the present invention is a frequency division multiple access receiver for telecommunication systems (FDMA), or time division multiple access (TDMA), or mixed (FDMA/TDMA), which re-employ a same frequency group in adjacent territorial areas, characterized in that it includes means for the actuation of the discrimination procedure of a wanted signal from a plurality of cochannel interferents, which already formed the object of an invention, as described in claim 13.

BRIEF DESCRIPTION OF DRAWINGS

Additional scopes and advantages of the present invention will be more evident from the following detailed description of an embodiment of the same and attached drawings, in which:

FIG. 5' shows a table comparing the main merit parameters of the receiver scope of the present invention, in which it is included $G_n(\theta)$, with the corresponding parameters of receivers employing different discrimination algorithms according to the known art;

FIG. 7' shows a table making the comparison of the main merit parameters of the receiver scope of the present invention, with the corresponding parameters of receivers employing the discrimination algorithms according to the known art, said parameters being calculated using matrices differently reduced compared to those of FIGS. 6 and 6'.

DETAILED DESCRIPTION

Figure 1:
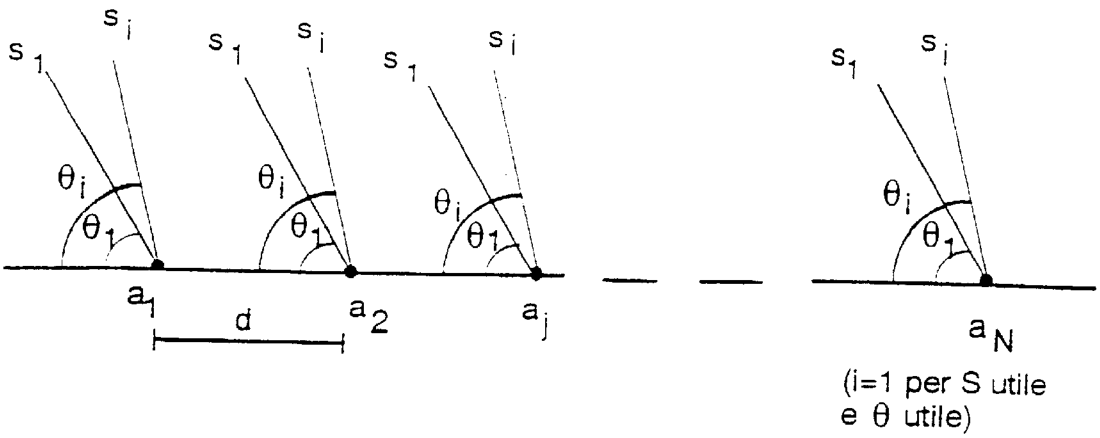
FIGS. 1 and 2 show an array of sensors used in the receiver of the present invention, when it is invested by plane waves coming from different directions.

Making reference to FIG. 1, we notice an array antenna consisting of N so electromagnetic field sensors identified $a_1, a_2, \ldots, a_i, \ldots, a_N$, of known type, arranged in straight line and separated one from the other by a distance d, typically $d \cong \lambda/2$, where $\lambda$ is the wave length of the radiofrequency in the middle of the band used by the particular mobile radio system employing the procedure scope of the invention (16 cm approx. in case of GSM 900 MHz, 8 cm in case of DCS 1800 MHz). The array is invested by a given number of plane waves $s_1, \ldots, s_i, \ldots, S_R$, whose arrival directions on the azimuth plane $\theta_1, \ldots$, are indicated for two of them, Values $\theta_1, \ldots, \theta_i$, corresponding to angles formed by radiuses $s_1, \ldots, s_i$ with the line of sensors $a_1, \ldots, a_N$. In a real scenario where the array is used by a base transceiver station (BTS) of a cellular telephone system, for instance GSM or DCS, plane waves $s_1, \ldots, s_i$ correspond respectively to echoes of a wanted signal (identified by index i=u) transmitted on an assigned carrier and time slot, and to interfering echoes generated in neighbouring cells by communication channels which re-employ the same frequency in the same time slot.

Figure 2:
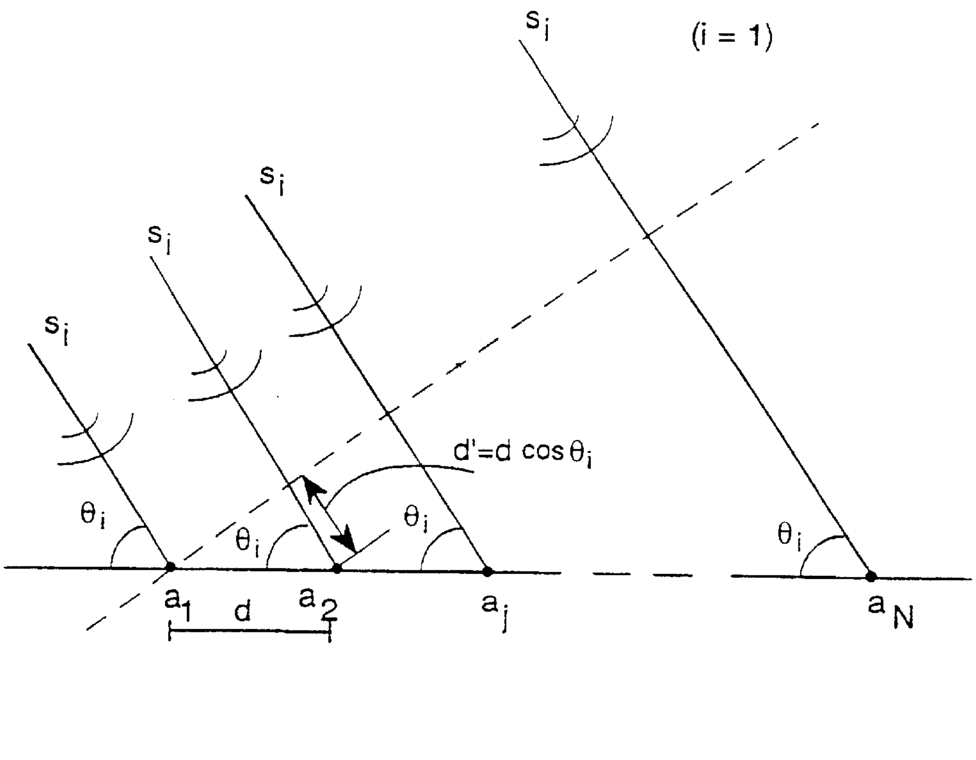

FIG. 2 is useful to evaluate the progressive delay, or the corresponding phase shifting, according to which a plane wave $s_i$ invests the different sensors of the array. If s(t) is a signal impinging on a uniform linear array from direction θ, the signal received by the $n^{th}$ sensors $x_n(t)$ is a phase shifted replica of the s(t) according to the relation:

$$x_n(t) = s(t)e^{j\frac{2(n-1)\pi d\cos(\theta)}{\lambda}} \text{ with } n = 1 \ldots N \tag{1}$$

Thus the replicas on different sensors can be described by $$x(t) = \begin{bmatrix} x_1(t) \\ x_n(t) \\ x_N(t) \end{bmatrix} = \begin{bmatrix} I \\ e^{j\frac{2\pi d(n-1)\cos(\theta)}{\lambda}} \\ e^{j\frac{2\pi d(N-1)\cos(\theta)}{\lambda}} \end{bmatrix} s(t) = \begin{bmatrix} d_1^*(\theta) \\ d_n^*(\theta) \\ d_N^*(\theta) \end{bmatrix} s(t) = d^*(\theta)s(t)$$

where $d_n^*(\theta)$ is the response of the $n^{th}$ sensor to a signal coming from the direction θ, Defining the response $d_n^*(\theta)$ as the complex conjugate of $d_n(\theta)$ is useful, in the following, to write linear combinations as scalar products.

In case of more signals $s_i(t)$ impinging from directions $\theta_i$, the signals $x_n(t)$ received by different sensors are described by:

$$x(t) = \begin{bmatrix} x_1(t) \\ x_n(t) \\ x_N(t) \end{bmatrix} = \sum_i d^*(\theta_i)s_i(t) + \begin{bmatrix} n_1(t) \\ n_n(t) \\ n_N(t) \end{bmatrix} \tag{2}$$

where $n_n(t)$ are the uncorrelated noise components on array sensors.

Figure 3:
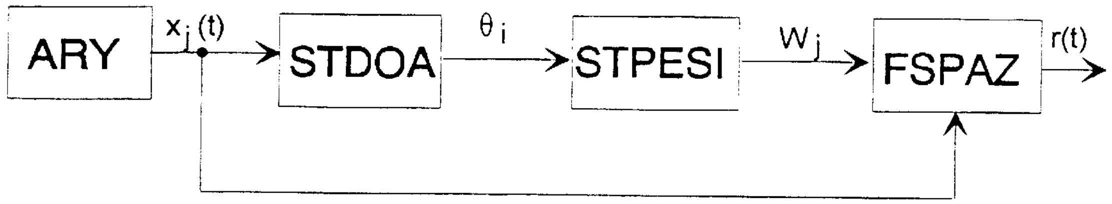
FIG. 3 shows a block diagram summarising the operational phases of the discrimination procedure object of the present invention.

Making reference to FIG. 3, we notice four blocks in cascade called ARY, STDOA, STPESI, and FSPAZ, respectively. The ARY block is the sensor array of FIG. 1 and 2 which gives the signals $x_n(t)$ given by the expression (2).

The STDOA block processes the signals $x_n(t)$ to estimate the number R of plane waves s, that invest the array ARY and the relative arrival directions (DOA Directions Of Arrival) on the azimuth plane, given by angles $\theta_i$. The operation of the STDOA block is known, for instance from [3] and [4].

The information obtained by the STDOA block, in particular the directions $\theta_i$, where implicitly a particular value i=u of index i indicates the direction $\theta_u$ of the wanted signal, is transferred to the next STPESI block that employs it in the calculation of appropriate spatial filtering coefficients $w_n$, according to a novel method which shall be shortly described.

Weights $W_n$, together with the signals $x_n(t)$ transduced by the array ARY, are allowed to reach the FSPAZ block that gives a reception signal r(t) cleaned from interferents, thanks to a spatial filtering (beam forming) employing the following expression:

$$r(t) = \sum_n w_n x_n(t) \tag{3}$$

where it can be noticed that the spatial filtering is a simple linear combination of signals $x_n(t)$, transduced by the array ARY, weighed by coefficients $w_n$.

The (3) can be written in a form suitable to highlight the $S_i$ signals impinging on the sensors of the array ARY:

$$r(t) = \sum_i s_i(t)\left(\sum_n w_n d_n^*(\theta_i)\right) + \sum_n w_n n_n(t) \tag{4}$$

whose usefulness is that to enable the calculation of weights $w_n$ according to the procedure scope of the present invention. It must be pointed out that incident signals $s_i(t)$ become accessible only through the corresponding transduced ones $x_n(t)$ For the determination of weights $w_n$ it is convenient to rewrite the (4) in vectorial form highlighting the contributions of the wanted signal $s_u(t)$, of interferents $s_i(t)$, and of the noise n(t), as it results from the following expression:

$$r(t) = s_u(t)(d^H w) + \sum_i s_i(t)(c_i^H w) + wn(t) \tag{5}$$

where:simbol $^H$ indicates a transposed and conjugated matrix w is the N element vector of coefficients $w_n$;

$d^H$ is the N element vector containing the response of the array in the direction $\theta_u$ of the wanted signal $s_u(t)$;

$c_i^H$ is the N element vector containing the response of the array in the $i^{th}$ interferent direction; the index i of the summation extends to value R−1; n(t) is the N elements noise vector.

As for the operation of the STPESI block, it is convenient, with the aid of the (6), to introduce two gain parameters, respectively identified $G_n$ and $G_i$ in order to be able to introduce constraint conditions on said parameters for the calculation of weights $w_n$. The above mentioned gains are the following:

Gain of wanted signal on noise:

$$G_n = \frac{\|d^H w\|^2}{\|w\|^2} \tag{6}$$

is the gain in the S/N ratio versus the traditional case of use of a single element antenna. The notation $\| \ldots \|$ indicates the Euclidean norm. The maximum value of $G_n$ is equal to $\|d\|^2$.

Gain of the wanted signal on the interferent i:

$$G_i = \frac{\|d^H w\|^2}{\|c_i^H w\|^2} \tag{7}$$

is the gain in the C/I ratio, concerning an interferent i, versus the traditional case of using a single element antenna, Analogously the gain of interferent on wanted signal is given by:

$$\frac{1}{G_i} = \frac{\|c_i^H w\|^2}{\|d^H w\|^2}$$

With these assumptions, the STPESI block calculates the vector of weights w satisfying the two following conditions:

A) constrains the gain $G_n$ in order that it is higher than, or equal to, a fraction $\alpha^2$ of the maximum value, in order to obtain the above mentioned advantages.

The parameter $\alpha^2$ can be varied in a continuous fashion in order to trade off interference reduction for directivity towards the user The condition A) is equivalent to the expression:

$$\frac{\|d^H w\|^2}{\|w\|^2} \geq \alpha^2 \|d\|^2 \tag{8}$$

B) minimizes the sum of gains of interferents on wanted signal, maintaining the constraint A) to the purpose of reducing the interference in uplink and downlink. Condition B) is equivalent to the following expression:

$$\min_w \left( \sum_i \frac{1}{G_i} \right) = \min_w \left( \frac{\|C^H w\|^2}{\|d^H w\|^2} \right) \tag{9}$$

where $C^H$ is a matrix formed by vectors $c_i^H$ of the (5).

Should all the interferents have the same power the (9) is equivalent to minimize the ratio between the sum of interferents' powers and the power of the wanted signal (I/C).

The STPESI block calculates the vector of weights w imposing the conditions (8) and (9). To simplify the computation and without involving any conceptual limitation to the procedure, it is imposed that:

$$d^H w = 1 \tag{10}$$

The above mentioned normalisation condition involves the multiplication of vector w by a constant scale factor, possibly complex, not influencing the spatial filtering made by the equation (5) since, as it can be noticed from the same, the wanted signal, interferents and noise would be multiplied by the same constant, and therefore the filtered signal, which can be denormalized dividing it by the same scale factor. With the setting of the (10) the (8) becomes:

$$\frac{1}{\|w\|^2} \geq \alpha^2 \|d\|^2 \tag{8'}$$

and the (9) becomes:

$$\min(\|C^H w\|^2) \tag{9'}$$

The STPESI block employs the method of Lagrange multipliers to make a constraind minimization of (9'). To this purpose, it is first constructed a function $F(w,\lambda,\beta,\chi)$ of variables $w,\lambda,\beta,\chi$, indicated with (11):

$$F(w, \lambda, \beta, \chi) = \|C^H w\|^2 + \lambda \left( \|w\|^2 - \frac{1}{\alpha^2 \|d\|^2} \right) + 2\beta(\mathrm{Re}(d^H w) - 1) + 2\chi(\mathrm{Im}(d^H w) - 1)$$

where parameters $w,\lambda,\beta,\chi$, are arbitrary constants to be determined equalling the gradient of $F(w,\lambda,\beta,\chi)$ to zero. The resulting equations are given by:

$$\frac{\partial F(w, \lambda, \beta, \chi)}{\partial w} = 2CC^H w + 2\lambda w + 2d(\beta + j\chi) = 0 \tag{12}$$

$$\frac{\partial F(w, \lambda, \beta, \chi)}{\partial \lambda i} = \|w\|^2 - \frac{1}{\alpha^2 \|d\|^2} = 0$$

$$\left( \frac{\partial F(w, \lambda, \beta, \chi)}{\partial \beta} + j \frac{\partial F(w, \lambda, \beta, \chi)}{\partial \chi} \right) = 2(d^H w - 1) = 0$$

Solving for $\beta,\chi$ and replacing it is possible to obtain the value of vector w according to the $\lambda$ parameter, the resulting expression is the following:

$$w = \frac{(CC^H + \lambda I)^{-1} d}{d^H (CC^H + \lambda I)^{-1} d} \tag{13}$$

where I is a unit matrix of the same order of the matrix C.

To solve the (13) it is first necessary to determine the value of the parameter $\lambda$. This real scalar is obtained assigning the desired value of the gain $G_n$ given by the (8'), that is equivalent to remove the > sign from the same expression, having imposed a precise value of $\alpha^2$. The (8') therefore becomes:

$$G_n = \frac{1}{\|w\|^2} = \alpha^2 \|d\|^2 \tag{8''}$$

Using a known factorization of eigenvalues and eigenvectors of the $CC^H$ matrix of the type:

$$CC^H = E^H \Delta E \tag{14}$$

where $\Delta$ is the diagonal matrix of the eigenvalues of $CC^H$, and E is the matrix of eigenvectors, we obtain the following expression of the gain (8"):

$$\frac{1}{\|w\|^2} = \frac{\|d\|^2 \left( \sum_i \frac{e_i^2}{\Delta_i + \lambda} \right)^2}{\sum_i \frac{e_i^2}{(\Delta_i + \lambda)^2}} \tag{15}$$

where $\Delta_i$ are the eigenvalues, real and not negative, of matrix $CC^H$; $e_i$ are the elements of the vector $e=|E^H d|$ more particularly, the elements $e_i$ correspond to the module of the components of vector $E^H d$; and $\lambda$ is the above mentioned real scalar, considered continuously variable to suit the arbitrary character of the selection of $\alpha^2$.

From the (8") and (15) the following equation is reached in the unknown $$\lambda: \frac{1}{\|w\|^2 \|d\|^2} = \frac{\left( \sum_i \frac{e_i^2}{\Delta_i + \lambda_1} \right)^2}{\sum_i \frac{e_i^2}{(\Delta_i + \lambda_1)^2}} = \alpha^2 \tag{16}$$

whose solution gives the numeric value of parameter $\lambda$ that replaced in the (14) gives in its turn the vector of weights w.

In view of a reduction of the computational complexity requested to the STPESI block, once the numeric value of the unknown $\lambda$ is obtained as said above, these can be replaced in the following equation:

$$w = \frac{E(\Delta + \lambda I)^{I} E^{H} d}{d^{H} E(\Delta + \lambda I)^{4} E^{H} d} \quad (17)$$

obtained replacing the (14) in the (13). The (17), contrarily to the (13), has the advantage not to require difficult matrix inversions, except for the easy inversion of the term in brackets which is a diagonal matrix.

Figure 4:
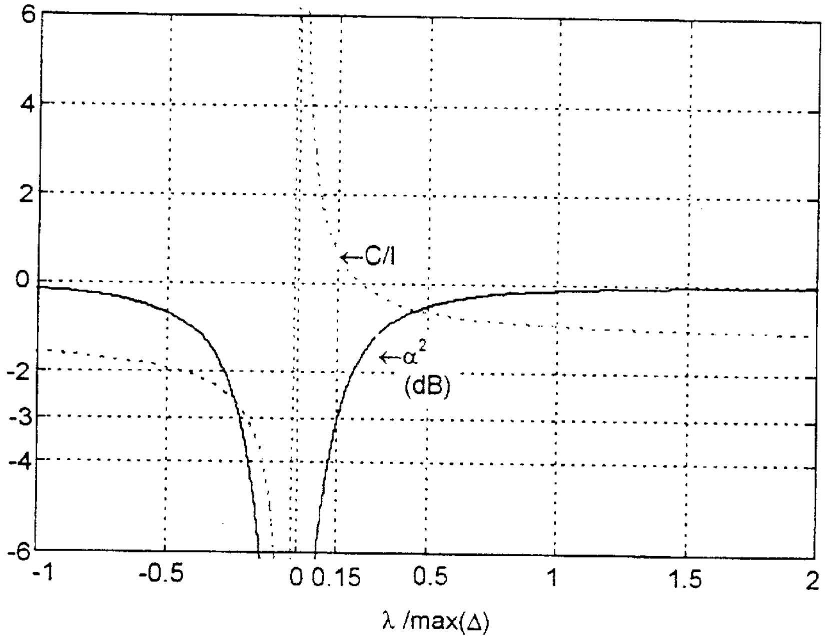
FIG. 4 shows the diagram of a function enabling to obtain a fictitious parameter useful to the calculation of weights entering the spatial filtering made according to the procedure of the invention.

As far as the solution of equation (16) in the unknown value λ. FIG. 4 shows with a continuous line the diagram of the function $$\frac{1}{\|w\|^2\|d\|^2}(\lambda)$$

(or equivalently $\alpha^2(\lambda)$ and with a dotted line the diagram of the function to be maximised $$\frac{1}{\|C^H w\|^2}(\lambda)$$

that corresponds to the gain in C/I in case of equal power interferents.

In FIG. 4 the x-axis indicates the λ value normalized at the value of the maximum eigenvalue $\max(\Delta_i)$ while on the y-axis values are in dB .

As it can be noticed from FIG. 4 the function $$\frac{1}{\|w\|^2\|d\|^2}(\lambda)$$

is always increasing for λ>0 and tends to 1 for λ→∞.

The study of both functions suggests a procedure for the solution of the (16) in the unknown λ. To this purpose the following steps are foreseen:

we calculate $$\frac{1}{\|w\|^2\|d\|^2}(\lambda = 0);$$

if $$\frac{1}{\|w\|^2\|d\|^2}(\lambda = 0) \geq \alpha^2$$

then we choose λ=0, because it is already the desired value since for λ=0 we obtain the unconstrained minimum value of $\|C^H\|$:

if $$\frac{1}{\|w\|^2\|d\|^2}(\lambda = 0) < \alpha^2$$

then λ is increased from 0 employing an iterative method for equation solution. In particular using the first order Newton method we obtain the iterative relation:

$$\lambda_{n+1} = \lambda_n + \frac{f(\alpha^2) - f\left(\frac{1}{\|w\|^2\|d\|^2}\right)(\lambda_n)}{\frac{d f\left(\frac{1}{\|w\|^2\|d\|^2}\right)}{d\lambda}(\lambda_n)}$$

where function f(x) is properly selected in order to guarantee the sequence convergence. Practically f(x) can be chosen as f(x)=log(x) or $$f(x) = \frac{x-1}{x+0.05}$$

For example from the diagrams of FIG. 4 it results that the case represented corresponds to a very low noise gain $G_n$ for λ=0. On the contrary, selecting $\alpha^2$=0.5 (−3dB) so that the gain in S/N is only 3 dB below the maximum achievable value, it results that the solution of (16) is approximately λ=0, 15×max(Δ).

Figure 5:
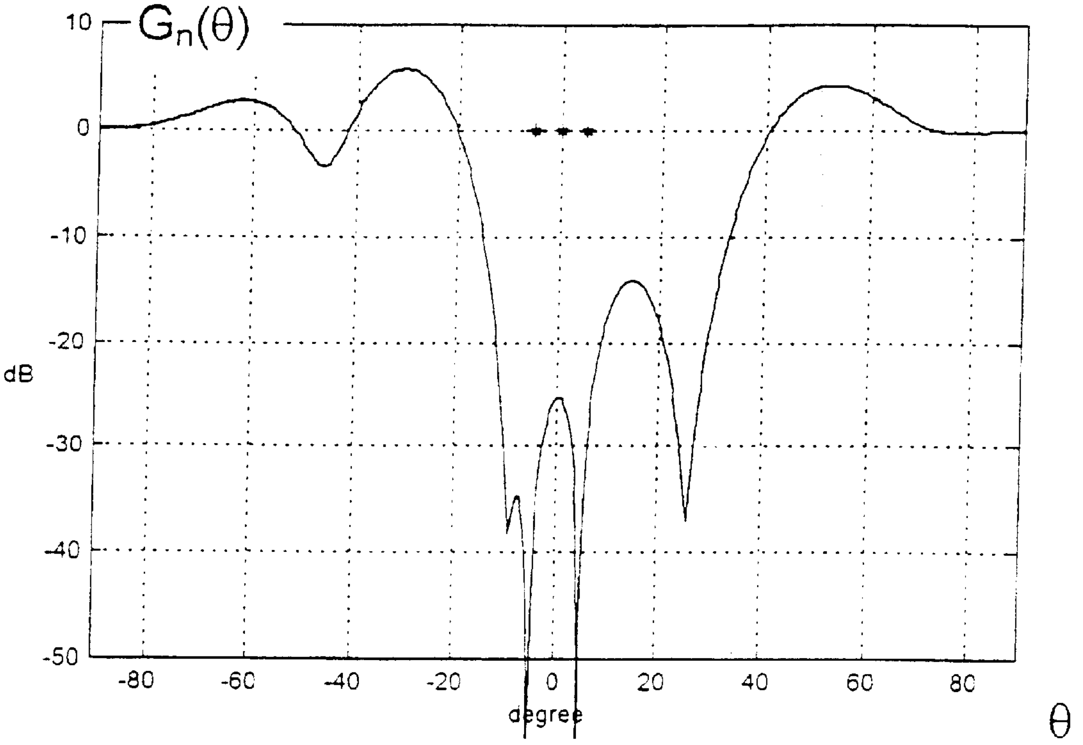
FIG. 5 shows a curve of the merit parameter $G_N(\theta)$ (Array gain) versus the arrival direction on the azimuth plane, for a receiver employing a to discrimination algorithm according to the known art.

Referring to FIGS. 5, 5', 6, 6', 7 and 7' the performance of the discrimination procedure scope of the present invention are now compared with similar performances of the main beamforming algorithms known so as described in [2]. The scope is that to highlight additional drawbacks of the known art now superseded by the present invention.

Figure 6:
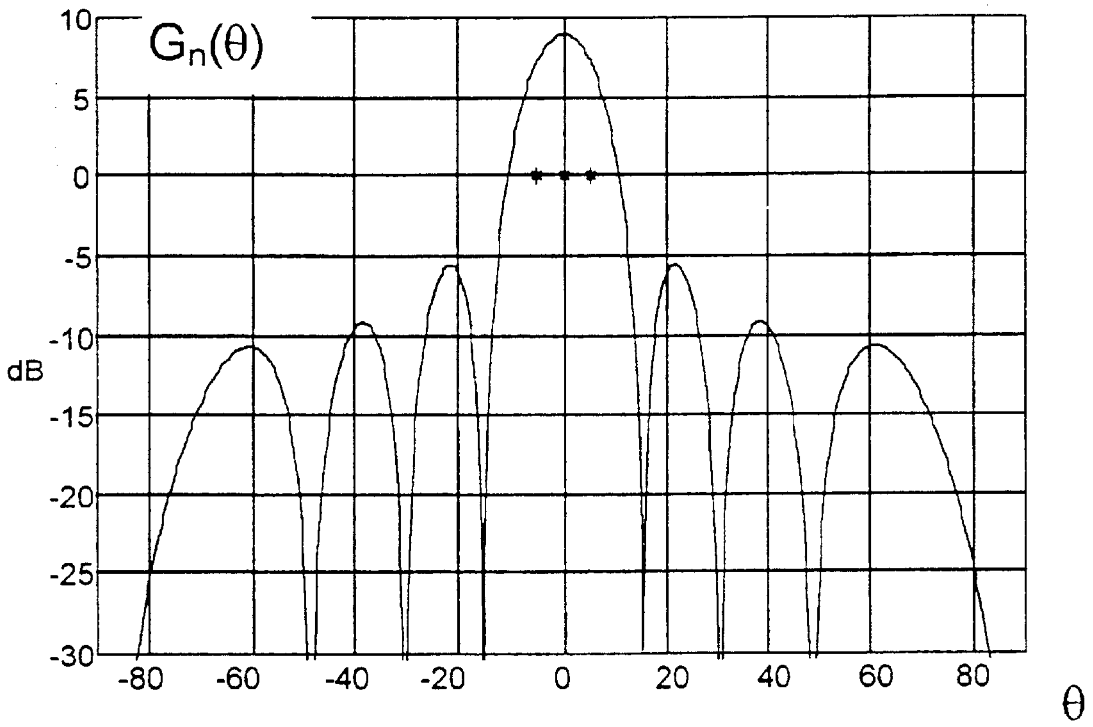
FIGS. 6 and 6' represent a curve and a table, respectively relative to the same merit parameters of FIGS. 5 and 5' calculated, contrarily to the first ones employing reduced rank matrices.
Figure 7:
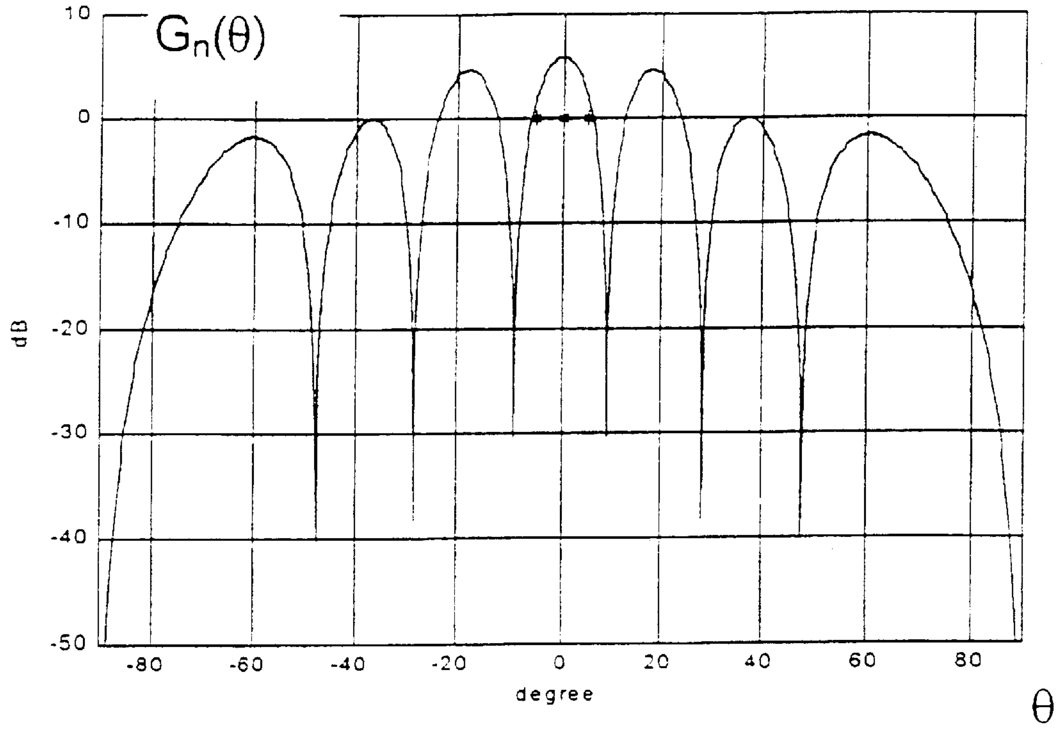
FIG. 7 shows a curve of the merit parameter $G_n(\theta)$ versus the direction on the azimuth plane for the receiver employing the discrimination procedure object of the present invention.

Merit parameters, expressed in dB, highlighted in the tables of FIGS. 5', 6' and 7' attached to the relative FIGS. 5, 6 and 7 are the following:

- the gain $G_n$ in the S/N ratio, versus a traditional antenna having a single element, given by (6);
- the gain in the C/I ratio between the wanted signal and the interferent signal at the output of the beamformer (FSPAZ block), versus a traditional antenna having a single element;
- the gain in the $$\frac{S}{N+I}$$

ratio between the wanted signal and the noise plus the interferent signal at the output of the beamformer (FSPAZ block), versus a traditional antenna having a single element. Concerning this last parameter, the following expression applies:

$$\frac{S_{out}}{N_{out} + I_{out}} = \frac{S_{in}}{\frac{N_{in}}{G_n} + \sum_i \frac{I_{i,in}}{G_i}} \quad (21)$$

Using the same terminology of [2], the known algorithms considered are the following:

1. Minimum Variance (MV): known the wanted signal direction, the weights $w_n$ are selected in order to minimize the power at the beamformer output with the condition $d^H w=1$.
2. Linear Constrained Minimum Variance (LCMV): in addition to the condition $d^H w=1$, the weights w, minimize the power at output of the beamformer with the additional constraints that the array response is null in the interferents directions $c_i^H w=0$ .
3. Linear Constrained (LC): weights $w_n$ meet the previous constraints on the wanted signal and on interferents, also minimizing $\|w\|^2$.

The procedure scope of the present invention is indicated in the tables with:

4. Constrained Gain Minimum Interference (CGMI): weights $w_n$ minimize the sum of gains of interferents on wanted signal ($\|C^H/w^2\|$), with the constraint that the gain $G_n$ of the wanted signal on the noise is higher than a pre-set threshold (6 dB in the following examples).

To obtain the above mentioned tables and comparison diagrams the following scenario was selected, particularly suitable to highlight the defects of the different algorithms:

an array of 8 elements is used a wanted signal with arrival direction orthogonal to the array plane (DOA=0°);

two interferents of equal power, one half of the wanted signal , with a small angular separation from this last: (C/I=0 dB; DOA=[−5°,5°]);

very low noise level (S/N=40 dB);

arrival directions of the wanted signal and interferents perfectly known.

Making reference to the comparison table 1 of FIG. 5', we can notice that the first 3 algorithms show poor performance due to a really low gain $G_n$ (−25 dB for LCMV and MV and −5 dB for LC), contrarily to what takes place for the CGMI method, which has a constrained $G_n$ equal to +6 dB, used in the discrimination procedure scope of the present invention. This means that, when using the LCMV or MV algorithm, the power radiated in downlink towards the mobile is 25 dB lower compared to the case of single element antenna. In this condition, also if interference is absent, the S/N at the mobile could be too low for a correct detection.

In the corresponding FIG. 5, showing the radiation diagram that is the gain $G_n(\theta)$ of the array concerning the application of the algorithm LCMV, we notice that the above mentioned diagram shows a very low value (−25 dB) in the wanted signal direction, null (−∞ dB) in the directions of interferents, and high values in the other values of 0. Thus FIG. 5 shows how, with algorithms from known art, most of the power is radiated in directions different from the wanted direction.

This behaviour is due to the fact that the LCMV algorithm, as the other known algorithms can run up against the inversion of almost singular matrixes, that is with very high condition number, when arrival directions of interferent and wanted signal are close each other.

A way to mitigate this effect is to use matrixes of reduced rank, obtained selecting only the highest singular values of the matrixes to invert.

FIGS. 6 and 6', maintaining the previous scenario, show the effects obtained employing reduced matrixes in the different algorithms indicated; the reduction is conducted selecting only the 2 highest singular values. Concerning the CGMI method used in the invention, it does not involve the inversion of nearly singular matrixes.

The radiation diagram of FIG. 6, still showing the array radiation diagram $G_n(\theta)$ concerning the application of the algorithm LCMV, has a much more higher directivity in the wanted, however, also interferent signals result very high. Table 2 of FIG. 6' confirms this behaviour and shows that with the known algorithms a high $G_n$ value is obtained in the wanted signal direction, but the capability to null the interferents is lost, as it results from the low values of parameter Δ(C/I). On the contrary, with the CGMI method, in which the gain $G_n$ is previously set at 6 dB, a higher reduction of interferents is obtained.

FIGS. 7 and 7', maintaining the previous scenario, show the effects obtained increasing to 3 the number of the highest singular values used in the inversion, in order to partially recover the capacity to nullify the interferents, though accepting to lose something in the gain $G_n$ since we come more close to the situation of FIGS. 5 and 5'. Actually, the results of Table 3 of FIG. 7' show the correctness of the reasoning, but show also that the gain $G_n$ of known algorithms is too low for a correct antenna operation, contrarily to what takes place for the CGMI method used in the invention.

FIG. 7 shows the radiation diagram obtained applying the CGMI method used in the present invention, confirming the results shown in the table.

What we can conclude from all comparisons made is that, differently form known algorithms, the algorithm which is the scope of the present invention allows to easily and continuously trade off antenna gain in the wanted signal direction for capacity to null the interferents. The conclusion is supported by the fact that the passage from the situation of Table 2 (FIG. 6') to that of Table 3 (FIG. 7'), describing known art results does not allow continuously variable intermediate situations, since reduced matrices can be only obtained selecting an integer number of singular values.

Figure 8:
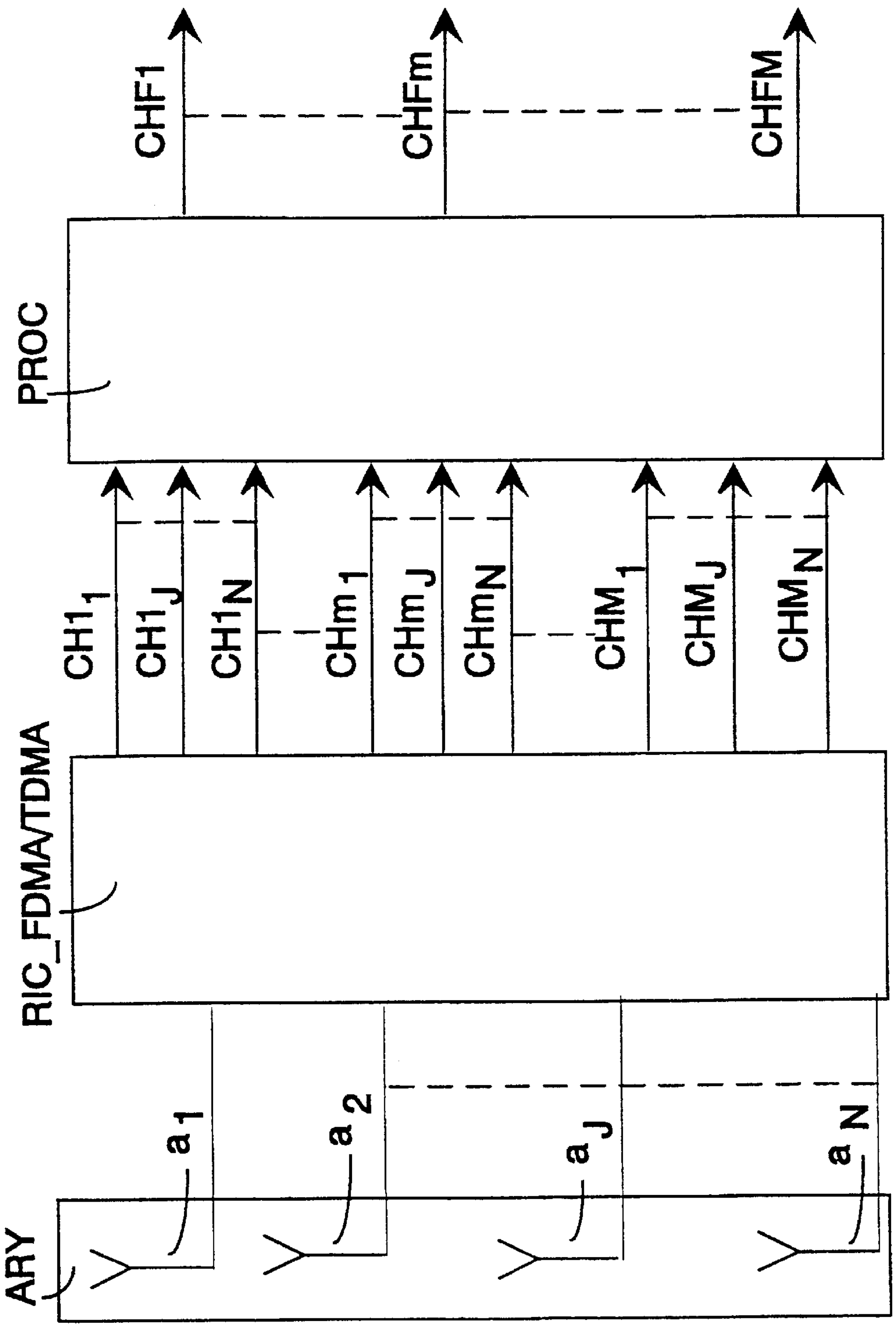
FIG. 8 shows a general block diagram of the receiver scope of the present invention.

FIG. 8 gives a general representation of a receiver for base transceiver station of a cellular telecommunication system GSM, or DCS type, employing the discrimination procedure scope of the present invention. More particularly, the receiver of FIG. 8, and the relative associated transmitter, can find application in frequency division (FDMA) or time division (TDMA), or mixed FDMA/TDMA multiple access systems re-employing a same frequency group in adjacent territorial areas.

Making reference to FIG. 8, we can notice the array antenna ARY consisting of N elements $a_1, \ldots, a_i, \ldots, a_N$, connected to a block RIC-FDMA/TDMA from which digital demodulated signals $CHm_j$ come out at each time slot, reaching a process module PROC. In the symbol $CHm_j$, the index m indicates the generic carrier m-th of the M separate carriers assigned to the receiver, while the index j indicates the j-th of the N replica of the reception signal relative to the m-th carrier. A snapshot is thus supplied of the signals coming out from the above mentioned block at the current time slot. The process module PROC processes, according to the procedure described above, the N replica of each one of the M channels CHm and supplies M digital signals CHFm, spatially filtered, corresponding to the M channels simultaneously received.

In the operation, the RIC-FDMA/TDMA block performs all the operations necessary to the reception of M channels of the FDMA/TDMA type from each one of the N sensors of the array, that is:

radiofrequency filtering for the suppression of the spurious out of the total reception band and subsequent frequency splitting;

conversion at intermediate frequency and filtering;

conversion analogue to digital:

best demodulation and filtering to obtain demultiplexed signals FDMA/TDMA, to be sent to the PROC block.

The M channels CHF1, . . . , CHFm, . . . , CHFM, spatially filtered, coming out from this last block suffer the following additional processing inside the receiver of FIG. 8:

reconstruction in base band of the M original transmission bursts associated to the M channels and positioning inside frames and multiframes; and new coding of digital bursts in a format (PCM 30 channels) compatible with the protocol (LAPD) adopted on beams connecting the base transceiver stations to the relative station controller (BSC).

The original character of this receiver is of course that of the PROC block, so that the RIC-FDMA/TDMA block can be considered known to the field technician. More particularly, it is possible to adopt for the above mentioned block, an architecture based on single narrow band receivers, as for instance results being that of the disposition of antenna according to the known art mentioned above, or a disposition based on the use of broad band transceivers simultaneously processing several channels, like for instance the one described in the European patent application No. 97830229.7 filed under the name of the same applicant.

Profitably, the PROC block of FIG. 8 can be implemented through a microprocessor for the mathematical processing of digital signals (DSP), or more adequately, through digital integrated circuits of the ASIC type (*Application Specific Integrated Circuit*).

Reference

[1] S. Anderson, M. Millnert, M. Viberg, B. Wahlberg. "An Adaptive Array for Mobile Communication Systems". IEEE Trans, Vehicular Technology, Vol. 40, No. 1. pp. 230–236, February 1991

[2] B. D. Van Veen, K. M. Bukley, "Beamforming: A Versatile Approach to Spatial Filtering". IEEE ASSP Magazine pp 4–24April 1988.

[3] M. Viberg, B. Ottersten, T. Kailath, "Detection and Estimation in Sensor Array Using Weighted Subspace Fitting", IEEE Transaction on Signal Processing. Vol. 39. No. 11. November 1991, pp. 2436–2448.

[4] Stoica, K. C. Sharman, "Novel eigenannalysis method for direction estimation", IEE Proccedings, Vol. 137, No. 1, February 1990. pp. 19–26.

What is claimed is:

1. Discrimination procedure of a wanted signal from a plurality of cochannel interferents received by array antennas of frequency division or time division or mixed multiple access telecommunication systems, re-employing a same group of frequencies in adjacent territorial areas, including an estimate phase of the number of said interferents and of the their arrival directions and of the arrival direction of said wanted signal and a subsequent spatial filtering phase in which signals transduced by relative sensors of a said array are linearly combined among them through multiplication coefficients or weights, obtaining a reception signal cleaned from interferents; said estimate phase and said spatial filtering phase being repeated for each one of the time slots in a TDMA frame, in which a wanted user transmits, wherein said weights meet the following conditions:

A) the gain of said array in the ratio between said wanted signal and noise components after spatial filtering, compared to the use of a single sensor, is constrained in order to result higher than or equal to a properly selected threshold;

B) the sum of gains of each interferent on the wanted signal after spatial filtering, compared to the use of a said single sensor, is minimized.

2. Procedure according to claim 1, wherein said spatial filtering is made employing the following expression valid for complex envelopes in base band:

$$r(t) = \sum_{n} w_n x_n(t)$$

where:

r(t) is a filter signal whose characteristics reflect said discrimination of the wanted signal from said interferents;

$x_n(t)$ are the said signals transduced by the relative said sensors ; and $w_n$ are said multiplication coefficients or weights.

3. Procedure according to claim 2, wherein said expression used to perform these spatial filtering is equivalent to the following one, given in vectorial form:

$$r(t) = s_u(t)(d^H w) + \sum_i s_1(t)(c_i^H w) + wn(t)$$

where:

$S_u(t)$ is said wanted signal incident on said array;

$S_i(t)$ is an interferent i-th of said plurality incident on said array;

w is the N elements vector of said weights, relative to said sensors $d^H$ is the N-element vector that indicates the response of the array in the direction of the wanted signal; $C_i^H$ is the N-element vector that indicates the response of the array in the interferent direction i-th of said plurality; and n(t) is a noise vector at N elements, each one associated to one said sensor.

4. Procedure according to claim 3 wherein said condition A) is equivalent to the expression:

$$\frac{\|d^H w\|^2}{\|w\|^2} \geq \alpha^2 \|d\|^2$$

and said condition B) is equivalent to the expression:

$$\min\left(\frac{\|C^H w\|^2}{\|d^H w\|^2}\right)$$

where:

$\alpha^2$ is a pre-set fraction of a maximum value $$\|d\|^2 = \max_w \left(\frac{\|d^H w^2\|}{\|w^2\|}\right)$$

being ∥ . . . ∥ the Euclidean norm; and $C^H$ is a matrix formed by vectors $c_i^H$.

5. Procedure according to claim 4, wherein said spatial filtering is made imposing the following normalization constraint:

$$d^H w = I.$$

6. Procedure according to claim 5, wherein said vector of weights w is calculated through the following expression $$w = \frac{(CC^H + \lambda I)^1 d}{d^H (CC^H + \lambda I)^1 d}$$

where:

I is a unit matrix of the same order of said matrix C;

λ is a real scalar parameter obtained solving the expression related to said condition A), in presence o said normalization constraint and imposing a precise value to said pre-set fraction $\alpha^2$.

7. Procedure according to claim 6, wherein a matrix $CC^H$ is submitted to a factorization at the eigenvalues and the eigenvectors of the type:

$$CC^H = E^H \Delta E$$

where:

Δ is the diagonal matrix containing the eigenvalues of said matrix, and

E is the matrix of eigenvectors.

8. Procedure according to claim 7, wherein that said vector of weights w is also calculated through the following expression:

$$w = \frac{E(\Delta + \lambda I)^{-1} E^H d}{d^H E(\Delta + \lambda I)^{-1} E^H d}$$

9. Procedure according to claim 7, or 8, wherein said parameter λ is obtained solving the following equation having one unknown value:

$$\frac{l}{\|w\|^2} = \frac{\|d\|^2 \left( \sum_i \frac{e_i^2}{\Delta_i + \lambda} \right)^2}{\sum_i \frac{e_i^2}{(\Delta_i + \lambda)^2}} = \alpha^2$$

where:

$\Delta_i$ are the eigenvalues, real and not negative, of the matrix $CC^H$; and e are the elements of a vector $e = |E^H d|$.

10. Procedure according to claim 9, wherein the above mentioned equation in said unknown Δ is solved in iterative way through the following steps:

it is calculated $$\frac{l}{\|w^2\| \; \|d^2\|}(\lambda = 0)$$

if $$\frac{l}{\|w^2\| \; \|d^2\|}(\lambda = 0) \geq \alpha^2$$

then we choose λ=0, because it is already the desired value since from the per λ=0 we obtain the minimum value of $\|C^{H2}\|$ if $$\frac{l}{\|w^2\| \; \|d^2\|}(\lambda = 0) < \alpha^2,$$

λ is increased from 0 using the interative relation:

$$\lambda_{n+1} = \lambda_n + \frac{f(a^2) - f\left( \frac{l}{\|w^2\| \|d^2\|} \right)(\lambda_n)}{\frac{df\left( \frac{1}{w^2 d^2} \right)_{(\lambda n)}}{d\lambda}}$$

where function f(x) is properly selected in order to guarantee the sequence convergence iterations are executed until it results $$\frac{l}{\|w^2\| \; \|d^2\|} \cong \alpha^2$$

11. Procedure according to any of the previous claims, wherein N=8 is said number of sensors and $\alpha^2=0.5$ is said pre-set fraction of said maximum value $\|d\|^2$.

12. Procedure according to any of the previous claims, wherein said telecommunication system is a cellular telephone system.

13. Receiver for frequency division, or time division, or mixed multiple access telecommunication systems, which re-employ a same frequency group in adjacent territorial areas, applying the discrimination procedure object of the previous claims, including:

an array of sensors of electromagnetic field radiofrequency filtering means of the signal coming from each sensor for the suppression of the spurious out of the global reception band, having downstream splitting means of a plurality of carriers;

Means for conversion and filtering at intermediate frequency: analogue-to-digital conversion means: demodulation and filtering means to obtain in base band demultiplexed signals of relative communication channels:

process means of said signals in base band and of reconstruction of the information originally transmitted on said channels; that wherein said processing means include also: estimate means of the arrival direction, of a wanted signal and of the number and arrival directions θ, of a plurality of cochannel interferents signals:

spatial filtering means of said signals in base band, to obtain reception signal cleaned from said interferents, said spatial filtering means linearly combining among them signals coming from the relative said sensors of a said array, through multiplication coefficients or weights;

calculation means of the gain of the wanted signal on the noise, spatially filtered, compared to the traditional case of utilization of a single element antenna:

Calculation means of the gain of the wanted signal on the interfernet i-th, spatially filtered, relating to an interferent i-th and for all the interferents, compared to a traditional case of use of an antenna to a single element;

means calculating said weights imposing a value of said gain of the wanted signal on noise, higher than or equal to a duly selected threshold, and simultaneously a minimum value of the sum of gains of each of said interferent on the wanted signal.

14. Receiver according to claim 13, wherein N=8 is the number of sensors and $\alpha^2=0.5$ is a predetermined fraction of a maximum value.

15. Receiver according to claim 13, or 14 wherein it is used in a cellular telecommunication system.

16. Receiver according to any claim 13 to 15, wherein said process means consist of digital integrated circuits of the ASIC type (Application Specific Integrated Circuit).

* * * * *